(12) United States Patent
Greizer et al.

(10) Patent No.: US 7,352,549 B1
(45) Date of Patent: Apr. 1, 2008

(54) METHOD OF AUTOMATICALLY RECOGNIZING AN ELECTRICAL SYSTEM

(75) Inventors: Frank Greizer, Kaufungen (DE); Sven Bremicker, Alheim-Baumbach (DE)

(73) Assignee: SMA Technologie AG, Niestetal (DE)

( * ) Notice: Subject to any disclaimer, the term of this patent is extended or adjusted under 35 U.S.C. 154(b) by 393 days.

(21) Appl. No.: 10/983,205

(22) Filed: Nov. 5, 2004

(51) Int. Cl.
*H02H 3/00* (2006.01)

(52) U.S. Cl. .......................................... 361/85; 361/62
(58) Field of Classification Search .................. 361/85, 361/62
See application file for complete search history.

(56) References Cited

U.S. PATENT DOCUMENTS 4,626,983 A * 12/1986 Harada et al. .............. 363/132

\* cited by examiner

*Primary Examiner*—Stephen W. Jackson
(74) *Attorney, Agent, or Firm*—Thomas R. Vigil

(57) ABSTRACT

The subject matter of the present invention is a method of automatically recognizing an electrical system by which both the voltage of an electrical system (2) and the phase angle between phases of the system are monitored so that human technical failure upon connecting a plant (1) to said electrical system (2) be reliably prevented.

6 Claims, 1 Drawing Sheet

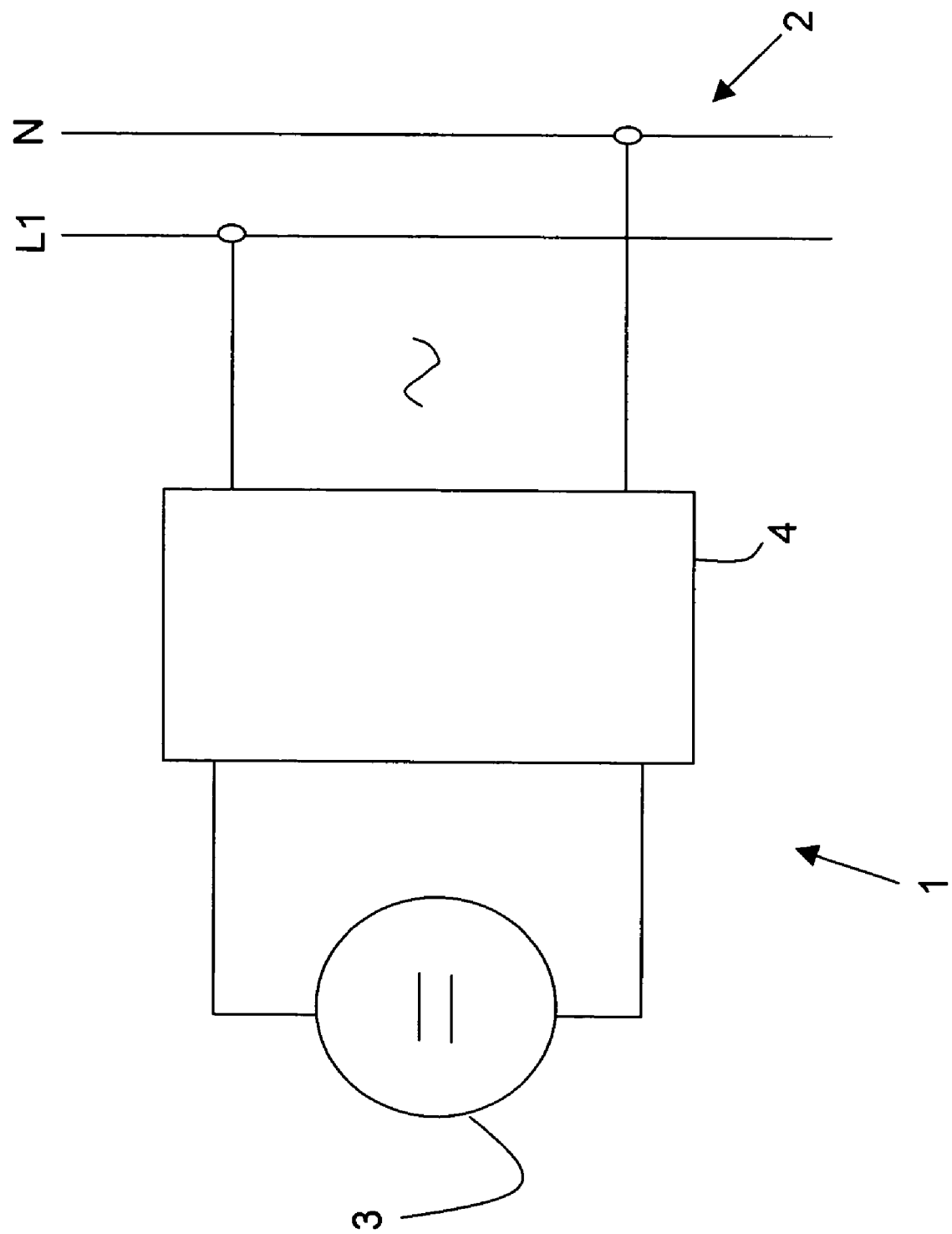

METHOD OF AUTOMATICALLY RECOGNIZING AN ELECTRICAL SYSTEM

FIELD OF THE INVENTION

The present invention relates to a method having the features recited in claim 1 and an inverter in accordance with the features of claim 6.

In certain countries, more specifically in the United States, various alternating current and three-phase systems are utilized for electric power supply. An electrical system can for example be a one-phase system having an alternating voltage of 120 V between the phases and neutral. Another electrical system can be a two-phase system having two line voltages of 120 V each relative to the neutral line. The phase angle between the two line voltages amounts to 180°, so that a line-to-line voltage of 240 V is obtained. Still another electrical system can for example be a three-phase system having three line voltages of 120 V each. The phase angles between the line voltages are 120° each, so that the line-to-line voltages obtained are of 208 V. A three-phase system with 3 line voltages of 277 V is also possible.

Standard rules and regulations govern electric power supply and define at which upper or lower limit value the mains electricity supply of a power plant, for example of a solar power plant, is to be interrupted. If the alternating voltage applied to the inverter is higher or lower than a certain value, the mains electricity supply must be interrupted in order to prevent other apparatus connected to the same system from being damaged.

Further, prior to connecting a plant to the respective system and to putting it into operation, an authorized skilled worker or person must check whether the inverter that is intended to be connected, is suited for the corresponding system. Otherwise, the inverter may often switch off improperly or non permissible operating conditions may occur as a result of mismatched tolerance variations between the system monitoring in the inverter and the respective system. This in turn can for example result in overvoltage damaging apparatus that are operated in parallel.

BRIEF SUMMARY OF THE INVENTION

It is therefore the object of the invention to find a solution by means of which an electrical system can be recognized beyond any doubt and that permits to avoid possible defective plants and the damages resulting therefrom.

The solution to this object is a method of automatically recognizing an electrical system by which both the electrical system voltages and the phase angle between the phases of the system are monitored.

The object is also accomplished by an inverter provided with voltage and phase measuring means as well as with control means, said means serving to automatically recognize the system and to automatically adapt to a system to be supplied.

The system recognition in accordance with the invention permits to prevent human technical failure upon connecting a plant to the mains. The voltage of the electrical system can be measured by measuring the voltage. The measurement of the phase angle is indicative of the type of electrical system at hand.

The measured information permits to control semiconductors and relays in such a manner that the right voltage or type of electrical system is automatically adjusted.

It is also advantageous that but one type of converter or inverter is needed, or needs to be held in store, for different types of electrical systems. 120 Volt, 208 Volt, 240 Volt or 277 Volt electrical systems can for example be taken into consideration. Manual conversion is not necessary.

In accordance with an advantageous embodiment of the invention there is provided that the corresponding method for interrupting the mains electricity supply is provided for the type of electrical system recognized and for its defined and valid limit value. This permits to reliably comply with the limit values and non permissible operation of a plant in the electrical system from which electricity is to be supplied is avoided.

Appropriately, the method of the invention is used for mains electricity supply in a photovoltaic plant. Such type plants can be readily connected to the electrical system without having to be checked at high cost by authorized staff.

In order to provide a universally utilizable solar inverter there is further provided that the voltage of an inverter circuit be automatically adapted on one side of the alternating voltage that is connectable to the electrical system. This considerably reduces the storage costs for storing different types of inverters for different electrical systems and dramatically simplifies the installation of these plants.

Further advantageous features of the invention will become apparent upon reading the subordinate claims.

The invention will be explained in closer detail hereinafter with reference to the drawing.

DETAILED DESCRIPTION OF THE INVENTION

As shown in FIG. 1, a photovoltaic plant 1 is to be connected to an alternating current electrical system 2. The photovoltaic plant 1 includes a photovoltaic generator 3 that delivers a direct voltage. Said direct voltage is converted by means of an inverter 4, more specifically of a solar inverter, into a voltage that is suited for the electrical system 2. For feeding, it is important that both the mains voltage and phase position be recognized.

In order to permit recognition of different electrical systems, the electrical system is automatically determined in the inverter by suited measuring means i.e., voltage and phase measuring means and the inverter is accordingly automatically adjusted to the right electrical system. The voltage, for example the effective voltage, and the phase angle between the phases are hereby measured.

The inverter 4 or the inverter circuit respectively can for example be designed so as to automatically recognize four types of electrical systems, namely a 120 Volt, a 208, 240 and 277 Volt system.

The method may also be suited for part thereof only, e.g., for 208/240 V.

The inverter 4 is preferably designed so that it automatically takes into consideration the limit values, i.e., the voltage limit values, at which the mains electricity supply must be interrupted.

We claim:

1. A method of automatically recognizing an electrical system by which both the voltage of an electrical system (2) and the phase angle between phases of the electrical system (2) and the phase angle between phases of the system are monitored, comprising the steps of:
   providing for the interrupting of the mains electricity supply on the basis of mains electricity supply limit values, upon the reaching of which, the mains electricity supply must be interrupted, and automatically recognizing and automatically adapting the voltage and phase measured via voltage and phase measuring means as well as, controlling the voltage and phase via control means to the system (2) that is to be supplied with electricity.

2. The method in accordance with claim 1, characterized by being used in photovoltaic solar plants (1) for a mains electricity supply.

3. The method in accordance with claim 1, characterized by automatic voltage adaptation of an inverter circuit on one side of an alternating voltage that is connectable to the electric system (2).

4. The method in accordance with claim 3, wherein the inverter circuit is a photovoltaic inverter circuit.

5. An inverter with means to perform the method according to claim 1, wherein said inverter is configured to be a solar inverter (4) that is connectable to a photovoltaic generator (3).

6. The inverter in accordance with claim 1, whereby it is configured to be a solar inverter (4) that is connectable to a photovoltaic generator (3).

* * * * *